US010022959B2

(12) United States Patent
Inoue

(10) Patent No.: US 10,022,959 B2
(45) Date of Patent: Jul. 17, 2018

(54) MOTOR DRIVE CIRCUIT, PRINTING APPARATUS, AND SEMICONDUCTOR DEVICE

(71) Applicant: Seiko Epson Corporation, Tokyo (JP)

(72) Inventor: Katsumi Inoue, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/434,256

(22) Filed: Feb. 16, 2017

(65) Prior Publication Data

US 2017/0253029 A1   Sep. 7, 2017

(30) Foreign Application Priority Data

Mar. 4, 2016   (JP) .................................. 2016-041859

(51) Int. Cl.
*B41J 2/045* (2006.01)
*H02P 6/08* (2016.01)
*H02P 25/06* (2016.01)
*H02P 6/14* (2016.01)

(52) U.S. Cl.
CPC ....... *B41J 2/04541* (2013.01); *B41J 2/04586* (2013.01); *H02P 6/085* (2013.01); *H02P 6/14* (2013.01); *H02P 25/06* (2013.01)

(58) Field of Classification Search
USPC ......................................... 318/280, 293, 294
See application file for complete search history.

(56) References Cited

U.S. PATENT DOCUMENTS

| 4,496,886 | A | * | 1/1985 | Gordon | ................. H02P 25/092 |
|---|---|---|---|---|---|
| | | | | | 318/254.1 |
| 4,581,565 | A | * | 4/1986 | Van Pelt | .................. H02P 7/04 |
| | | | | | 318/294 |
| 4,924,158 | A | * | 5/1990 | Kelley | ................. H02H 7/0838 |
| | | | | | 318/293 |
| 7,112,937 | B1 | * | 9/2006 | Stemple | .................... H02P 7/29 |
| | | | | | 318/478 |

FOREIGN PATENT DOCUMENTS

JP         2012-178948 A       9/2012

* cited by examiner

*Primary Examiner* — Bentsu Ro
(74) *Attorney, Agent, or Firm* — Harness, Dickey & Pierce, P.L.C.

(57) ABSTRACT

A motor drive circuit which drives a motor, includes a driving unit that supplies a drive current to the motor on the basis of a control signal, an amplification unit that amplifies a potential difference between a first node of a wire, through which at least a portion of the drive current flows, and a second node of the wire, and a controller that generates the control signal on the basis of comparison between the potential difference amplified by the amplification unit and a threshold voltage.

8 Claims, 9 Drawing Sheets

MOTOR DRIVE CIRCUIT, PRINTING APPARATUS, AND SEMICONDUCTOR DEVICE

CROSS-REFERENCE TO RELATED APPLICATION

The entire disclosure of Japanese Patent Application No. 2016-041859, filed Mar. 4, 2016 is expressly incorporated by reference herein.

BACKGROUND

1. Technical Field

The present invention relates to a motor drive circuit, a printing apparatus, and a semiconductor device.

2. Related Art

In recent years, various motors are used in electronic apparatuses for various purposes. For example, in a printer, a motor is used for moving a carriage on which a cartridge is mounted or for transporting a printing paper.

In order to use a motor, a motor drive circuit which drives a motor is needed. For example, JP-A-2012-178948 discloses a motor drive circuit which uses an H bridge circuit. In the motor drive circuit, driving control of a motor is performed on the basis of a potential difference between two ends of a current sensing resistor which is generated due to an electric current flowing through the H bridge circuit.

However, there is a case where an electric current of several amperes is needed to rotate a motor and when the resistance value of the current sensing resistor is large, power loss in the resistor becomes large. Although it is conceivable to increase the size of the current sensing resistor and to lower the resistance value of the current sensing resistor in order to reduce the power loss, the size of the circuit becomes large in this case.

SUMMARY

An advantage of some aspects of the invention is to provide a motor drive circuit and a semiconductor device with which it is possible to reduce the size of a circuit and to reduce power loss that is attributable to detection of a drive current of a motor. In addition, another advantage of some aspects of the invention is to provide a printing apparatus with which it is possible to reduce power loss that is attributable to driving of a motor.

The invention can be realized in the following aspects or application examples.

Application Example 1

According to this application example, there is provided a motor drive circuit which drives a motor. The motor drive circuit includes a driving unit that supplies a drive current to the motor on the basis of a control signal, an amplification unit that amplifies a potential difference between a first node of a wire, through which at least a portion of the drive current flows, and a second node of the wire, and a controller that generates the control signal on the basis of comparison between the potential difference amplified by the amplification unit and a threshold voltage.

According to the motor drive circuit in the application example, the wire resistance between the first node and the second node of the wire, through which the drive current flows, is used as a current sensing resistor for detecting the drive current of the motor instead of a resistance element. Therefore, it is possible to reduce the size of the circuit in comparison with a circuit in the related art in which a resistance element is used. Furthermore, according to the motor drive circuit in the application example, a current sensing resistor with a smaller resistance value than in the related art can be realized using the wire resistance and thus it is possible to reduce the power loss that is attributable to detection of the drive current of the motor. In addition, according to the motor drive circuit in the application example, although the current sensing resistor has a small resistance value and thus a potential difference that is generated when the drive current flows is small, since the control signal is generated after comparing a voltage, which is obtained when the amplification unit amplifies the potential difference, with the threshold voltage, it is possible to appropriately control the drive current.

Application Example 2

In the motor drive circuit according to the application example, the wire may be electrically connected to a terminal to which a reference potential is supplied.

Since a drive current of several amperes or more may be needed to rotate the motor, it is necessary to operate a portion of the motor drive circuit at a high voltage. According to the motor drive circuit in the application example, since all the amplification unit have to do is to amplify the potential difference between the first node and the second node which is generated due to the drive current flowing to a supply source (for example, the ground) of the reference potential (for example, the ground potential), the amplification unit can be operated at a low voltage. Therefore, it is possible to reduce the electric power required for the operation of the amplifying unit, and to reduce the power loss in the entire motor drive circuit.

Application Example 3

In the motor drive circuit according to the application example, the driving unit may be provided on a substrate in which a plurality of metallic layers are laminated via insulating layers, the wire may include a first metal wire that is provided in a first metallic layer among the plurality of metallic layers and a second metal wire that is provided in a second metallic layer among the plurality of metallic layers, the first node may be provided in the second metal wire, and the second node may be provided in the first metal wire.

If a resistance value of the wire resistance between the first node and the second node is excessively small, the accuracy of drive current control may be decreased with the S/N (signal to noise) of an output signal from the amplification unit being deteriorated. According to the motor drive circuit in the application example, the first node and the second node are provided in different metallic layers. Therefore, the length of the wire between the first node and the second node becomes appropriately long and the resistance value of the current sensing resistor can be set to be appropriately small. Accordingly, according to the motor drive circuit in the application example, it is possible to reduce the power loss that is attributable to detection of the drive current while securing the accuracy of motor driving control.

Application Example 4

In the motor drive circuit according to the application example, the wire may include a third metal wire that is provided in a third metallic layer among the plurality of metallic layers, which is provided between the first metallic layer and the second metallic layer.

According to the motor drive circuit in the application example, the wire between the first node and the second node is provided across at least three metallic layers. Therefore, the length of the wire between the first node and the second node becomes appropriately long and the resistance value of the current sensing resistor can be set to be appropriately small. Accordingly, according to the motor drive circuit in the application example, it is possible to reduce the power loss that is attributable to detection of the drive current while securing the accuracy of motor driving control.

Application Example 5

In the motor drive circuit according to the application example, the first metallic layer may be the metallic layer most distant from the substrate among the plurality of metallic layers, and the second metallic layer may be the metallic layer most close to the substrate among the plurality of metallic layers.

According to the motor drive circuit in the application example, the first node and the second node are provided in two farthest apart metallic layers, respectively. Therefore, the length of the wire between the first node and the second node becomes appropriately long and the resistance value of the current sensing resistor can be set to be appropriately small. Accordingly, according to the motor drive circuit in the application example, it is possible to reduce the power loss that is attributable to detection of the drive current while securing the accuracy of motor driving control.

Application Example 6

In the motor drive circuit according to the application example, the driving unit may be provided on a substrate in which a plurality of metallic layers are laminated via insulating layers, the wire may include a first metal wire that is provided in a first metallic layer among the plurality of metallic layers, and the first node and the second node may be provided in the first metal wire.

According to the motor drive circuit in the application example, the first node and the second node are provided in one metal wire that is provided in one metallic layer. Therefore, the length of the wire between the first node and the second node can be set to be short and the resistance value of the current sensing resistor can be set to be appropriately small. Accordingly, according to the motor drive circuit in the application example, it is possible to reduce the power loss that is attributable to detection of the drive current.

Application Example 7

In the motor drive circuit according to the application example, a resistance value between the first node and the second node of the wire may be equal to or less than $0.1\Omega$.

According to the motor drive circuit in the application example, the resistance value between the first node and the second node is smaller than the resistance value (several ohms) of a resistance element which is used in a current sensing resistor in the related art, and thus it is possible to reduce the power loss that is attributable to detection of the drive current.

Application Example 8

According to this application example, there is provided a printing apparatus including the motor drive circuit according to any one of the application examples.

Since the printing apparatus in the application example includes the motor drive circuit with which it is possible to reduce the power loss that is attributable to detection of the drive current of the motor, according to the printing apparatus in the application example, it is possible to reduce the power loss that is attributable to driving of the motor.

Application Example 9

According to this application example, there is provided a semiconductor device which drives a motor. The semiconductor device includes a driving unit that supplies a drive current to the motor on the basis of a control signal, an amplification unit that amplifies a potential difference between a first node of a wire, through which at least a portion of the drive current flows, and a second node of the wire, and a controller that generates the control signal on the basis of comparison between the potential difference amplified by the amplification unit and a threshold voltage.

According to the semiconductor device in the application example, as a resistance for detecting the drive current of the motor, a resistance of a wire, through which the drive current flows, is used instead of a resistance element. Therefore, it is possible to reduce the size of the circuit. Furthermore, according to the semiconductor device in the application example, a resistor with a smaller resistance value than in the related art can be realized using the wire resistance and thus it is possible to reduce the power loss that is attributable to detection of the drive current of the motor. In addition, according to the semiconductor device in the application example, although the potential difference between the first node and the second node, which is generated when the drive current flows, becomes small as the resistance value of the wire resistance between the first node and the second node becomes small, since the control signal is generated after comparing a voltage, which is obtained when the amplification unit amplifies the potential difference with the threshold voltage, it is possible to appropriately control the drive current.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferable embodiments of the invention will be described with reference to the drawings. The drawings are used for convenience of explanation. The embodiments which will be described below are not for limiting the contents of the invention described in the claims in an unfair manner. In addition, the all of the components described below are not necessarily essential constituent elements of the present invention.

1. Motor Drive Circuit
1-1. Configuration and Operation of Motor Drive Circuit

Figure 1:
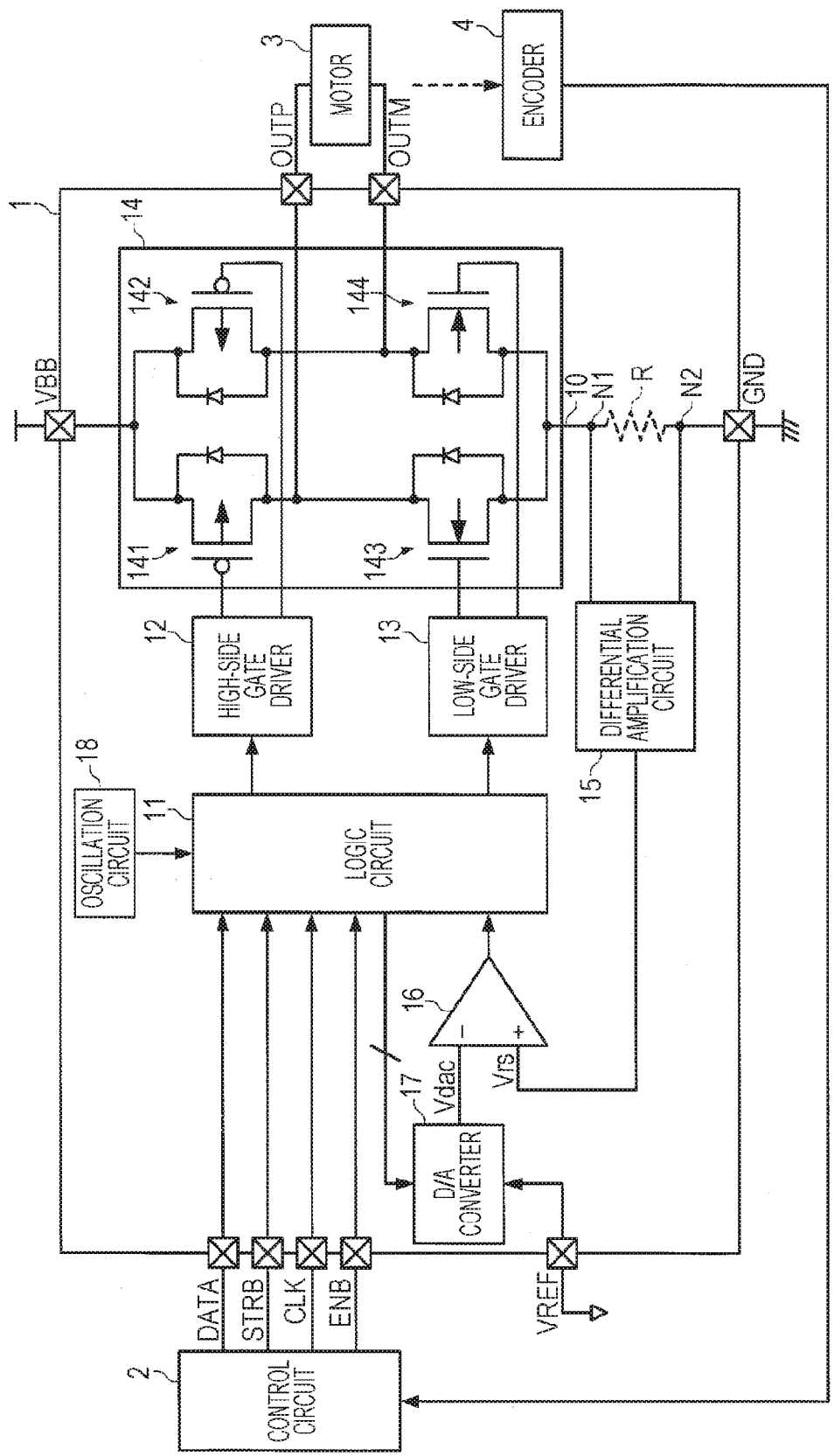
FIG. 1 is a diagram illustrating a configuration of a motor drive circuit.

FIG. 1 is a diagram illustrating a configuration of a motor drive circuit 1 according to an embodiment. The motor drive circuit 1 according to the embodiment is configured as an integrated circuit (IC) (semiconductor device). A control circuit 2 and a motor 3 are connected to an external terminal of the motor drive circuit 1 and the motor drive circuit 1 drives the motor 3 while controlling a flowing direction, the amount, and the timing of a drive current flowing to the motor 3 on the basis of a signal supplied from the control circuit 2.

As illustrated in FIG. 1, the control circuit 2 is connected to four external terminals DATA, STRB, CLK, and ENB of the motor drive circuit 1. A serial data signal, a strobe signal and a serial clock signal from the control circuit 2 are input to the external terminals DATA, STRB, and CLK of the motor drive circuit 1, respectively. The serial data signal, the strobe signal and the serial clock signal are signals for various settings of the motor drive circuit 1. In addition, an enable signal for on/off control of a driving operation of the motor 3 which is performed by the motor drive circuit 1 is input to an external terminal ENB of the motor drive circuit 1 from the control circuit 2. The motor drive circuit 1 drives the motor 3 when the enable signal input from the external terminal ENB is in an active state (in the embodiment, high level) and stops the driving of the motor 3 when the enable signal is in an non-active state (in the embodiment, low level).

The motor 3 is connected to two external terminals OUTP and OUTM of the motor drive circuit 1. The motor 3 is, for example, a brushed motor, a brushless motor, a stepping motor, a linear motor, and the like. The motor 3 is rotated due to a drive current which is supplied from one of the external terminals OUTP and OUTM of the motor drive circuit 1.

The rotational state (the rotation rate or the like) of the motor 3 is detected by an encoder 4 and is fed back to the control circuit 2. The control circuit 2 sets the state of a signal to be supplied to the external terminal ENB of the motor drive circuit 1 to become the active state (high level) or the non-active state (low level) on the basis of a detection signal from the encoder 4 so that the motor 3 performs a desired rotation operation.

As shown in FIG. 1, the motor drive circuit 1 according to the embodiment is configured to include a logic circuit 11, a high-side gate driver 12, a low-side gate driver 13, an H bridge circuit 14, a differential amplification circuit 15, a comparator 16, a D/A (digital to analog) converter 17 and an oscillation circuit 18. A portion of constituent components (respective components) of the motor drive circuit 1 shown in FIG. 1 may be omitted or changed, and other constituent components may be added thereto.

The oscillation circuit 18 performs an oscillation operation to generate an internal clock signal. The oscillation circuit 18 is realized by, for example, an RC oscillator circuit, an LC oscillator circuit, a ring oscillator, and the like.

The logic circuit 11 is operated being synchronized with the internal clock signal output from the oscillation circuit 18. Specifically, the logic circuit 11 writes a desired value on a desired bit in a register (not shown) inside the logic circuit when a serial data signal, a strobe signal and a serial clock signal with a predetermined format are input from the external terminals DATA, STRB, and CLK.

In addition, the logic circuit 11 generates a control signal for operating the high-side gate driver 12 and the low-side gate driver 13 when the enable signal input from the external terminal ENB is in the active state (high level). More specifically, when the enable signal is in the active state (high level), if the output voltage of the comparator 16 is low (for example, 0 V), the logic circuit 11 controls the high-side gate driver 12 and the low-side gate driver 13 so that an electric current flows into the motor 3, and if the output voltage of the comparator 16 is high (for example, 5 V) the logic circuit 11 controls the high-side gate driver 12 and the low-side gate driver 13 so that an electric current flows into the motor 3. In addition, the logic circuit 11 generates a control signal for stopping the operation of the high-side gate driver 12 and the low-side gate driver 13 when the enable signal input from the external terminal ENB is in the non-active state (low level).

The high-side gate driver 12 performs on/off control of a PMOS transistor 141 and a PMOS transistor 142 which are included in the H bridge circuit 14 according to the control signal from the logic circuit 11.

The low-side gate driver 13 performs on/off control of an NMOS transistor 143 and an NMOS transistor 144 which are included in the H bridge circuit 14 according to the control signal from the logic circuit 11.

The H bridge circuit 14 is configured to include the PMOS transistor 141, the PMOS transistor 142, the NMOS transistor 143 and the NMOS transistor 144.

A source terminal of the PMOS transistor 141 and a source terminal of the PMOS transistor 142 are connected to each other and are connected to a power source terminal VBB of the motor drive circuit 1 through the same wire. From the power source terminal VBB, a high supply voltage (for example, 42 V) which is required to drive the motor 3 is supplied.

In addition, a drain terminal of the PMOS transistor 141 and a drain terminal of the NMOS transistor 143 are connected to each other and are connected to an external terminal OUTP through the same wire. The external terminal OUTP is connected to a positive electrode terminal of the motor 3.

In addition, a drain terminal of the PMOS transistor 142 and a drain terminal of the NMOS transistor 144 are connected to each other and are connected to an external terminal OUTM through the same wire. The external terminal OUTM is connected to a negative electrode terminal of the motor 3.

In addition, a source terminal of the NMOS transistor 143 and a source terminal of the NMOS transistor 144 are connected to each other and are connected to a ground terminal GND of the motor drive circuit 1 through the same wire 10. The ground terminal GND is grounded and a ground potential (0 V) (an example of the reference potential) is supplied to the ground terminal GND.

Two control signals from the high-side gate driver 12 are respectively supplied to a gate terminal of the PMOS transistor 141 and a gate terminal of the PMOS transistor 142. When the level of a control signal supplied to the gate terminal of the PMOS transistor 141 is low (for example, 37 V), the PMOS transistor 141 is turned on (electrical connection between a source and a gate is established) and when the level of the control signal is high (for example, 42 V), the PMOS transistor 141 is turned off (electrical connection between a source and a gate is not established). Similarly, when the level of a control signal supplied to the gate terminal of the PMOS transistor 142 is low (for example, 37 V), the PMOS transistor 142 is turned on (electrical connection between a source and a gate is established) and when the level of the control signal is high (for example, 42 V), the PMOS transistor 142 is turned off (electrical connection between a source and a gate is not established).

In addition, two control signals from the low-side gate driver 13 are respectively supplied to a gate terminal of the NMOS transistor 143 and a gate terminal of the NMOS transistor 144. When the level of a control signal supplied to the gate terminal of the NMOS transistor 143 is high (for example, 5 V), the NMOS transistor 143 is turned on (electrical connection between a source and a gate is established) and when the level of the control signal is low (for example, 0 V), the NMOS transistor 143 is turned off (electrical connection between a source and a gate is not established). Similarly, when the level of a control signal supplied to the gate terminal of the NMOS transistor 144 is high (for example, 5 V), the NMOS transistor 144 is turned on (electrical connection between a source and a gate is established) and when the level of the control signal is low (for example, 0 V), the NMOS transistor 144 is turned off (electrical connection between a source and a gate is not established).

Figure 2:
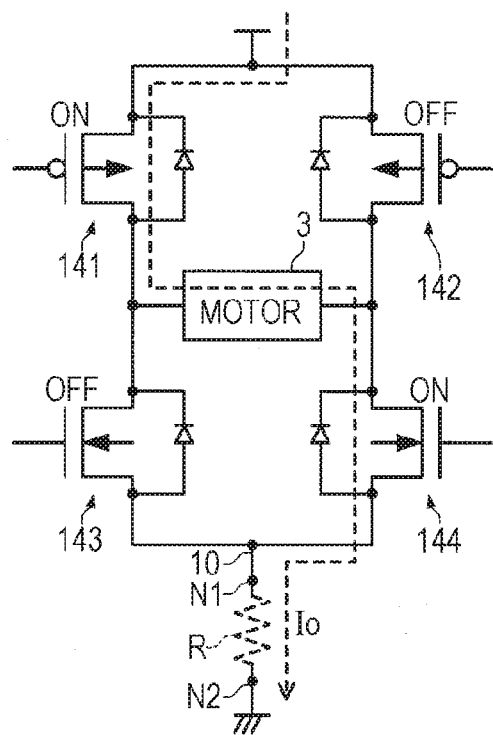
FIG. 2 is a diagram for explaining an operation of an H bridge circuit.

As illustrated in FIG. 2, in a state where the PMOS transistor 141 and the NMOS transistor 144 are turned on and the PMOS transistor 142 and the NMOS transistor 143 are turned off, an electric current path from a supply line of the supply voltage to the ground is formed via the PMOS transistor 141 and the NMOS transistor 144. Therefore, a drive current Io flows from the positive electrode terminal of the motor 3 to the negative electrode terminal of the motor 3, and the motor 3 rotates in a clockwise direction as seen from the positive electrode terminal side at a rate according to the drive current Io, for example.

Figure 3:
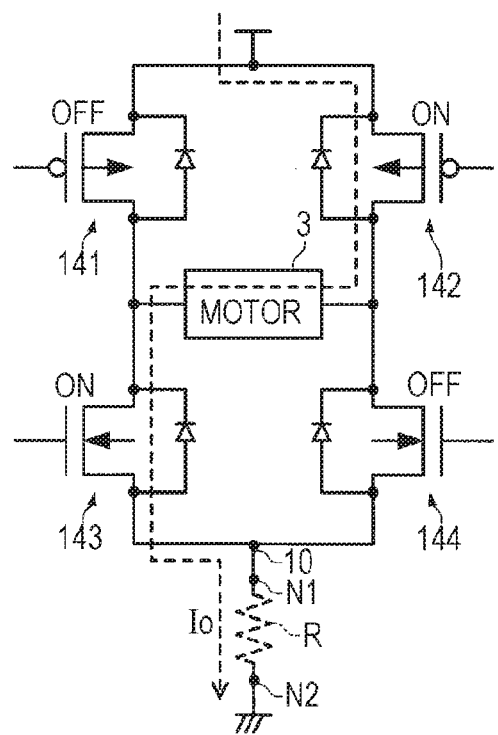
FIG. 3 is a diagram for explaining an operation of the H bridge circuit.

Meanwhile, as illustrated in FIG. 3, in a state where the PMOS transistor 142 and the NMOS transistor 143 are turned on and the PMOS transistor 141 and the NMOS transistor 144 are turned off, an electric current path from the supply line of the supply voltage to the ground is formed via the PMOS transistor 142 and the NMOS transistor 143. Therefore, the drive current Io flows from the negative electrode terminal of the motor 3 to the positive electrode terminal of the motor 3, and the motor 3 rotates in a counter clockwise direction as seen from the positive electrode terminal side at a rate according to the drive current Io, for example.

To rotate the motor 3, for example, the drive current Io of several amperes is needed. In a case where the rotation of the motor 3 is stopped, for example, all of the PMOS transistor 141, the PMOS transistor 142, the NMOS transistor 143 and the NMOS transistor 144 are turned off. Accordingly, the electric current path from the supply line of the supply voltage to the ground is blocked and the supply of the drive current Io to the motor 3 is stopped.

When the electric current path in FIG. 2 or FIG. 3 is formed, the drive current Io flows through the wire 10 also, and the voltage of a second node N2 on the wire 10 drops relative to that of a first node N1 on the wire 10 corresponding to the product of the resistance value of a wire resistance R formed between the first node N1 and the second node N2 and the current value of the driving current Io. The differential amplification circuit 15 outputs a voltage Vrs which is obtained by amplifying the potential difference between the first node N1 and the second node N2 of the wire 10, the potential difference being generated due to the voltage drop.

The D/A converter 17 outputs a voltage Vdac according to digital data stored in a predetermined plurality of bits of the register (not shown) in the logic circuit 11 while using a reference voltage, which is supplied from an external terminal VREF of the motor drive circuit 1, as a reference. The control circuit 2 sets the digital data that is input into the D/A converter 17 in the register using the external terminals DATA, STRB, and CLK of motor drive circuit 1 in advance.

The comparator 16 compares an output voltage Vrs of the differential amplification circuit 15 with the output voltage Vdac of the D/A converter 17. Specifically, the output voltage Vrs of the differential amplification circuit 15 is supplied to a non-inverting input terminal (+) of the comparator 16 and the output voltage Vdac of the D/A converter 17 is supplied to an inverting input terminal (−) of the comparator 16. Then, the comparator 16 outputs a high level voltage (for example, 5 V) when the output voltage Vrs of the differential amplification circuit 15 is higher than the output voltage Vdac of the D/A converter 17 and outputs a low level voltage (for example, 0 V) when the output voltage Vrs of the differential amplification circuit 15 is lower than the output voltage Vdac of the D/A converter 17.

The operating voltage (for example, 5 V) of the logic circuit 11, the low-side gate driver 13, the differential amplification circuit 15, the comparator 16, the D/A converter 17 and the oscillation circuit 18 and the operating voltage (for example, 37 V) of the high-side gate driver 12 may be supplied from a power source terminal (not shown) of the motor drive circuit 1 and may be generated by a voltage divider (not shown) or a regulator on the basis of the supply voltage (for example, 42 V) supplied from the power source terminal VBB.

Figure 4:
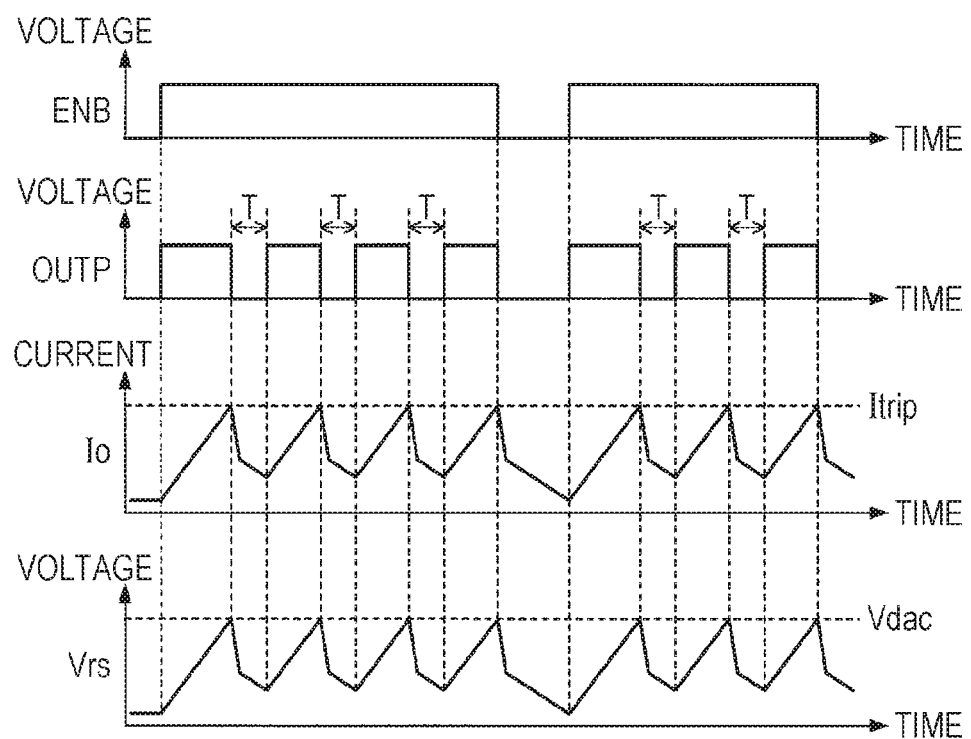
FIG. 4 is a waveform diagram illustrating an example of the operation of the motor drive circuit.

FIG. 4 is a waveform diagram illustrating an operation example of the motor drive circuit 1 in a case where the motor 3 is a brushed motor. As illustrated in FIG. 4, when the level of the external terminal ENB (enable signal) is changed from low to high, The logic circuit 11 controls the high-side gate driver 12 and the low-side gate driver 13 to operate the H bridge circuit 14. Therefore, for example, the PMOS transistor 141 and the NMOS transistor 144 are turned on and the PMOS transistor 142 and the NMOS transistor 143 are turned off (a state in FIG. 2), whereby the electric current path from the supply voltage to the ground is formed. As a result of this, an electric current flows into the motor 3 with the voltage of the external terminal OUTP being close to the supply voltage and the drive current Io increases.

As the drive current Io increases, the potential difference between the first node N1 and the second node N2 of the wire 10 is increased and the output voltage Vrs of the differential amplification circuit 15 is also increased. Then, when the output voltage Vrs of the differential amplification circuit 15 reaches the output voltage Vdac of the D/A converter 17, the logic circuit 11 controls the high-side gate driver 12 and the low-side gate driver 13 to stop the operation of the H bridge circuit 14. Therefore, the PMOS transistor 141 and the NMOS transistor 144 are turned off for a certain time T. Since the electric current path from the supply line of the supply voltage to the ground is blocked for the certain time T, the voltage of the external terminal OUTP is decreased and electric current supply to the motor 3 is stopped. However, since a regenerative current is generated by an inductance component of the motor 3 during the certain time T, the drive current Io does not become zero immediately but gradually decreases.

When the certain time T elapses, the logic circuit 11 controls the high-side gate driver 12 and the low-side gate driver 13 to operate the H bridge circuit 14 again. Therefore, an electric current flows into the motor 3 again with the voltage of the external terminal OUTP being close to the supply voltage and the drive current Io increases. Thereafter, the H bridge circuit 14 is controlled in the same manner as described above while the level of the external terminal ENB (enable signal) is high. Note that, the certain time T may be settable using the register in the logic circuit 11.

Such control is called "constant current chopping control" since the drive current Io repeatedly increases and decreases with a current value Itrip as its peak and the current value Itrip is approximately constant. Note that, the output voltage Vdac of the D/A converter 17 is adjusted such that the current value Itrip becomes a desired current value.

In addition, the control circuit 2 can control the drive current Io of the motor 3 by changing the length of a period, in which the enable signal supplied to the external terminal ENB of the motor drive circuit 1 is in the active state (high level), on the basis of the detection signal from the encoder 4. Such control is called "enable pulse width modulation (PWM) control".

That is, FIG. 4 shows an example in which the control circuit 2 performs the enable PWM control and the motor drive circuit 1 performs the constant current chopping control in a period in which the enable signal is in the active state (high level).

In the motor drive circuit 1 according to the embodiment which is configured as described above, the H bridge circuit 14 corresponds to a driving unit that supplies the drive current Io to the motor 3 on the basis of a control signal. In addition, the differential amplification circuit 15 corresponds to an amplification unit that amplifies the potential difference between the first node N1 of the wire 10, through which at least a portion of the drive current Io flows, and the second node N2 of the wire 10. In addition, the logic circuit 11, the high-side gate driver 12, the low-side gate driver 13 and the comparator 16 correspond to a controller that generates the control signal of the H bridge circuit 14 on the basis of comparison between the potential difference (the output voltage Vrs of the differential amplification circuit 15) amplified by the amplification unit (the differential amplification circuit 15) and a threshold voltage (the output voltage Vdac of the D/A converter 17).

1-2. Configuration of Current Sensing Resistor

Since a motor drive circuit in the related art is provided with an external resistance element (a resistance component) as a current sensing resistor for detecting the drive current, if the drive current is, for example, 1 A, even when a resistance element (a resistance component) with a relatively small resistance value of approximately 0.3Ω, the current sensing resistor consumes 0.3 W of power. In contrast to this, in the motor drive circuit 1 according to the embodiment, the current sensing resistor for detecting the drive current Io is realized by a wire resistance between the first node N1 and the second node N2 of the wire 10. Since the motor drive circuit 1 is formed on a semiconductor substrate of an IC (semiconductor device), the wire resistance of several milliohms to several tens of milliohms can be easily realized. Accordingly, when a wire resistance of 3 mΩ is used as the current sensing resistor in a case where the drive current Io is, for example, 1 A, the power consumed in the current sensing resistor consumes becomes 0.003 W and it is possible to decrease the power consumed in the current sensing resistor to $\frac{1}{100}$ of that in the motor drive circuit in the related art.

Figure 5:
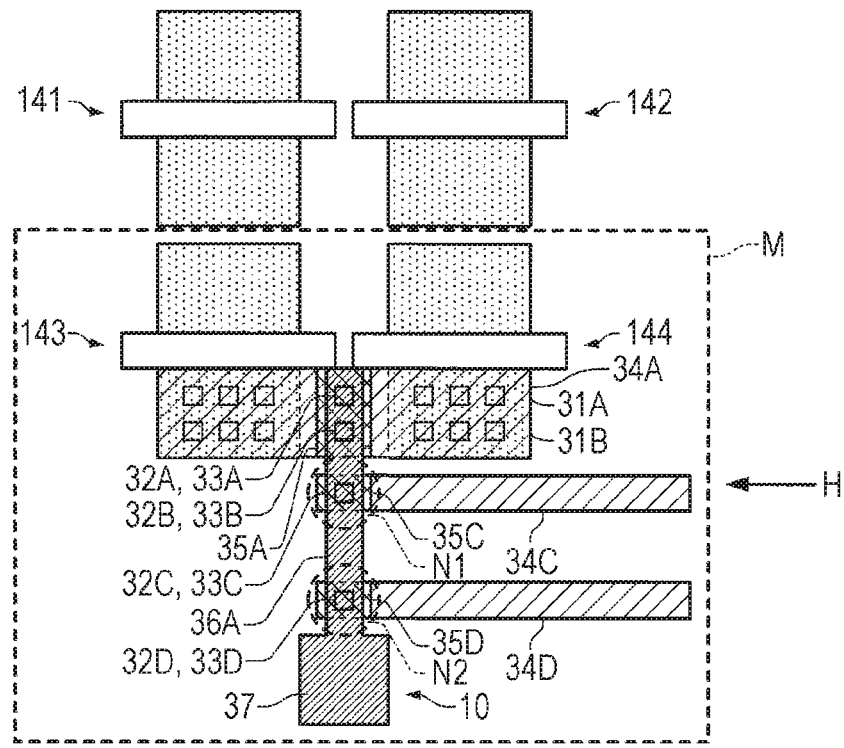
FIG. 5 is a plan view schematically illustrating a first example of a current sensing resistor realized using a wire resistance.
Figure 6:
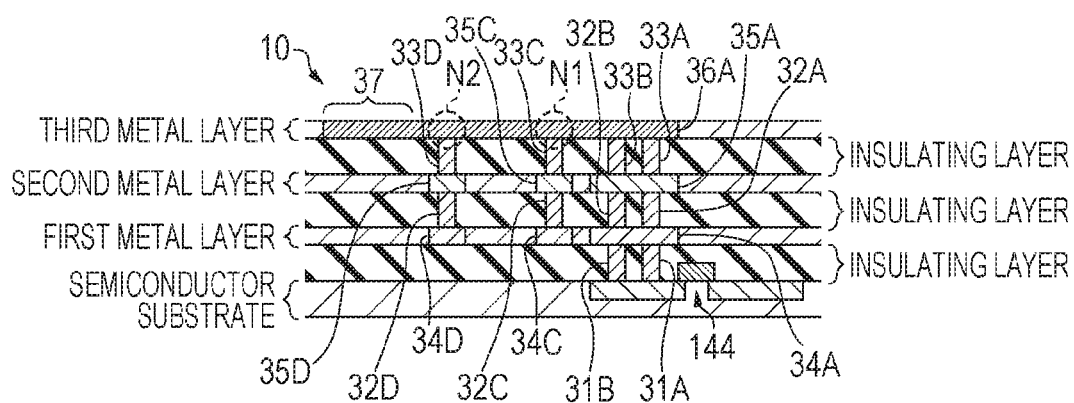
FIG. 6 is a sectional view schematically illustrating the first example of a current sensing resistor realized using a wire resistance.

FIGS. 5 and 6 are views schematically illustrating a first example of a current sensing resistor realized using a wire resistance. FIG. 5 is a schematic view illustrating a planar configuration around the H bridge circuit 14 as seen from above the semiconductor substrate on which the motor drive circuit 1 is formed. In addition, FIG. 6 is a schematic view illustrating a sectional configuration of a region M that is surrounded by broken lines in FIG. 5 as seen from a direction H. Note that, FIGS. 5 and 6 illustrate only a portion of the wires.

As illustrated in FIGS. 5 and 6, the H bridge circuit 14 (the PMOS transistor 141, 142 and the NMOS transistor 143, 144) is provided on the semiconductor substrate (an example of a substrate) in which a plurality of metal layers (metallic layers) are laminated via insulating layers. The plurality of metal layers are configured with, for example, a first metal layer, a second metal layer and a third metal layer. The third metal layer (an example of a first metallic layer) is the metal layer (the uppermost metal layer) most distant from the semiconductor substrate among the plurality of metal layers. In addition, the first metal layer (an example of a second metallic layer) is the metal layer (the lowermost metal layer) most close to the semiconductor substrate among the plurality of metal layers. In addition, the second metal layer (an example of a third metallic layer) is a metal layer between the third metal layer and the first metal layer.

The wire 10 includes a metal wire 36A (an example of a first metal wire) which is provided in the third metal layer, a metal wire 34A (an example of a second metal wire) which is provided in the first metal layer, and a metal wire 35A (an example of a third metal wire) which is provided in the second metal layer. In addition, the wire 10 includes metal wires 34C and 34D which are provided in the first metal layer, metal wires 35C and 35D provided in the second metal layer. In addition, the wire 10 includes vias 33A and 33B which connect the metal wire 36A and the metal wire 35A to each other, a via 33C which connects the metal wire 36A and the metal wire 35C to each other, a via 33D which connects the metal wire 36A and the metal wire 35D to each other, vias 32A and 32B which connect the metal wire 35A and the metal wire 34A to each other, a via 32C which connect the metal wire 35C and the metal wire 34C to each other, and a via 32D which connect the metal wire 35D and the metal wire 34D to each other. In addition, the wire 10 includes contacts 31A and 31B which connect the metal wire 34A and a source terminal (a source electrode) of the NMOS transistor 144.

The metal wires 34A, 34C, 34D, 35A, 35C, 35D, and 36A are formed of, for example, conductive materials such as aluminum (Al) or copper (Cu). In addition, the vias 32A, 32B, 32C, 32D, 33A, 33B, 33C, and 33D and the contacts 31A and 31B are formed of, for example, conductive materials such as tungsten (W).

A rectangular pad portion 37 which functions as the ground terminal GND is provided in an end portion of the metal wire 36A and the pad portion 37 is grounded through a bonding wire which is not shown.

In addition, the first node N1 and the second node N2 are provided in the metal wire 36A. The first node N1 is connected to the metal wire 35C provided in the second metal layer through the via 33C, and the metal wire 35C is connected to the metal wire 34C provided in the first metal layer through the via 32C. Similarly, the second node N2 is connected to the metal wire 35D provided in the second metal layer through the via 33D and the metal wire 35D is connected to the metal wire 34D provided in the first metal layer through the via 32D.

In addition, the metal wire 34C and the metal wire 34D are connected to two input terminals (input electrodes) (not shown) of the differential amplification circuit 15 through a wire (not shown). That is, a resistance of a portion of the wires of the metal wire 36A (wires between the first node N1 and the second node N2) functions as the current sensing resistor. The resistance value (the resistance value between the first node N1 and the second node N2) of the wire resistance (the current sensing resistor) is equal to or less than 0.1Ω and thus it is possible to realize the current sensing resistor having a resistance value of several milliohms to several tens of milliohms. However, if the resistance value of the current sensing resistor is excessively small, the potential difference between the two input terminals of the differential amplification circuit 15 (the potential difference between the first node N1 and the second node N2) becomes significantly small, and the difference from the noise level becomes small. As a result of this, S/N of the output signal of the differential amplification circuit 15 may be decreased and the accuracy in a driving operation of the motor 3 which is performed by the motor drive circuit 1 may be decreased. For example, when a meandering wire is used as the metal wire 36A or a layout in which a distance between the NMOS transistors 143 and 144 and the pad portion 37 is long (the length of the metal wire 36A is large) is used so that the distance between the first node N1 and the second node N2 becomes long, the current sensing resistor can have an appropriately small resistance value such that the driving accuracy of the motor 3 is not greatly affected.

Figure 7:
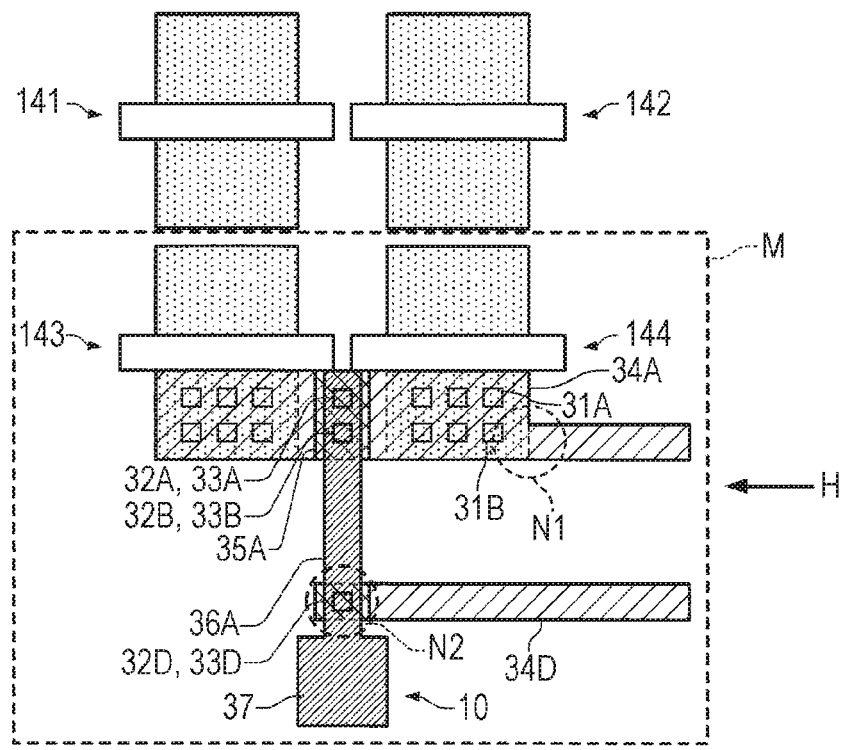
FIG. 7 is a plan view schematically illustrating a second example of a current sensing resistor realized using a wire resistance.
Figure 8:
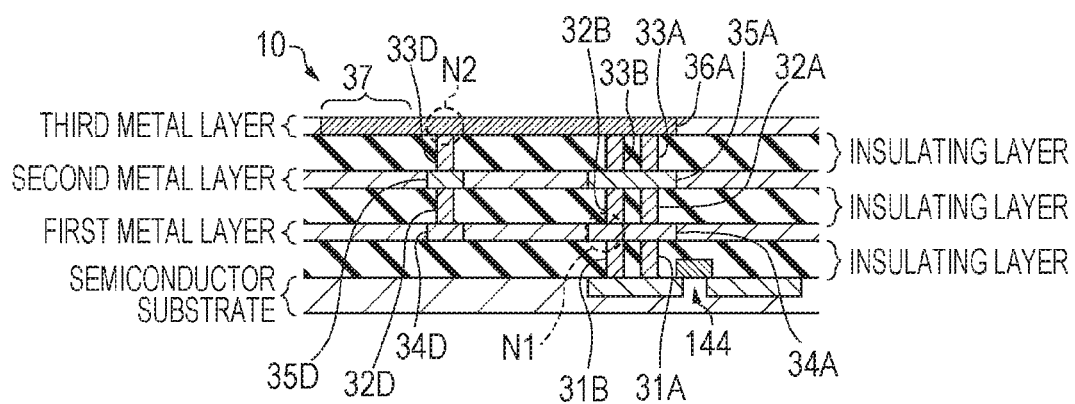
FIG. 8 is a sectional view schematically illustrating the second example of a current sensing resistor realized using a wire resistance.

FIGS. 7 and 8 are views schematically illustrating a second example of a current sensing resistor realized using a wire resistance. As with FIG. 5, FIG. 7 is a schematic view illustrating a planar configuration around the H bridge circuit 14 as seen from above the semiconductor substrate on which the motor drive circuit 1 is formed. In addition, FIG. 8 is a schematic view illustrating a sectional configuration of a region M that is surrounded by broken lines in FIG. 7 as seen from a direction H. Note that, as with FIGS. 5 and 6, FIGS. 7 and 8 illustrate only a portion of the wires. In FIGS. 7 and 8, the same constituent elements as in FIGS. 5 and 6 are given the same reference numerals and the description thereof will be omitted.

In an example shown in FIGS. 7 and 8, the first node N1 is provided in the metal wire 34A (an example of a second metal wire) and the second node N2 is provided in the metal wire 36A (an example of a first metal wire). In addition, since the first node N1 is provided in the metal wire 34A, the metal wires 34C, 35C and the vias 32C, 33C in FIGS. 5 and 6 are not provided. In addition, the metal wire 34A and the metal wire 34D are connected to two input terminals (input electrodes) (not shown) of the differential amplification circuit 15 through a wire (not shown). That is, a resistance of a portion of wires constituted by the metal wires 34A, 35A, and 36A, and the vias 32A, 32B, 33A, and 33B (wires between the first node N1 and the second node N2) functions as the current sensing resistor. The resistance value (the resistance value between the first node N1 and the second node N2) of the wire resistance (the current sensing resistor) is equal to or less than 0.1Ω and thus it is possible to realize the current sensing resistor having a resistance value of several milliohms to several tens of milliohms. Particularly, in this second example, the resistance value of the current sensing resistor is obtained by adding respective resistance values of the metal wire 34A the first metal layer, the metal wire 35A which is provided in the second metal layer, the vias 32A and 32B the first metal layer and the second metal layer, and the vias 33A and 33B which are provided between and the second metal layer and the third metal layer to the resistance value of the metal wire 36A which is provided in the third metal layer. Therefore, it is possible to realize the current sensing resistor having an appropriate resistance value with the same layout area as in the first example.

1-3. Operation Effect

According to the motor drive circuit 1 in the above-described embodiment, it is possible to use the wire resistance between the first node N1 and the second node N2 of the wire 10 as the current sensing resistor for detecting the drive current Io of the motor 3 instead of a resistance element, and thus it is possible to reduce the size of the circuit in comparison with a circuit in the related art in which a resistance element is used. Furthermore, according to the motor drive circuit 1 in the embodiment, a current sensing resistor with a smaller resistance value than in the related art can be realized using the wire resistance and thus it is possible to reduce the power loss that is attributable to detection of the drive current Io. In addition, according to the motor drive circuit 1 in the embodiment, although the current sensing resistor has a small resistance value and thus a potential difference that is generated when the drive current Io flows is small, since the control signal of the H bridge circuit 14 is generated after comparing the voltage Vrs, which is obtained when the differential amplification circuit 15 amplifies the potential difference, with the output voltage Vdac of the D/A converter 17, it is possible to appropriately control the drive current Io.

In addition, according to the motor drive circuit 1 in the embodiment, since the differential amplification circuit 15 amplifies the potential difference between the first node N1 and the second node N2 which is generated due to the drive current Io flowing from the source terminal of the NMOS transistor 143 or the source terminal of the NMOS transistor 144 to the ground through the ground terminal GND, the differential amplification circuit 15 is operated at a low voltage (for example, 5 V). Therefore, it is possible to reduce the electric power required for the operation of the differential amplification circuit 15, and to reduce the power loss in the entire motor drive circuit 1.

In addition, according to the motor drive circuit 1 in the embodiment, in the first example shown in FIGS. 5 and 6, the first node N1 and the second node N2 are provided in the metal wire 36A that is provided in the third metal layer.

Therefore, the length of the wire between the first node N1 and the second node N2 can be set to be short and the resistance value of the current sensing resistor can be set to be small. Accordingly, according to the motor drive circuit 1 in the embodiment, it is possible to reduce the power loss that is attributable to detection of the drive current Io.

In addition, according to the motor drive circuit 1 in the embodiment, in the second example shown in FIGS. 7 and 8, the first node N1 is provided in the metal wire 36A that is provided in the third metal layer (the uppermost metal layer) and the second node N2 is provided in the metal wire 34A that is provided in the first metal layer (the lowermost metal layer). Therefore, the length of the wire between the first node N1 and the second node N2 becomes appropriately long and the resistance value of the current sensing resistor can be set to be appropriately small. Accordingly, according to the motor drive circuit 1 in the embodiment, it is possible to reduce the power loss that is attributable to detection of the drive current Io while securing the accuracy of driving control of the motor 3.

2. Printing Apparatus 2-1. Outline of Printing Apparatus

A printing apparatus according to the embodiment is an ink jet printer that forms a ink dot group on a printing medium such as paper by ejecting ink according to image data supplied from an external host computer to print an image (including texts, figures or the like) according to the image data. The configuration of the printing apparatus is not limited as long as the printing apparatus performs printing on a medium and examples of the printing apparatus include a laser printer, a stereoscopic molding apparatus (a so-called 3D printer), printing equipment and the like in addition to the ink jet printer.

Figure 9:
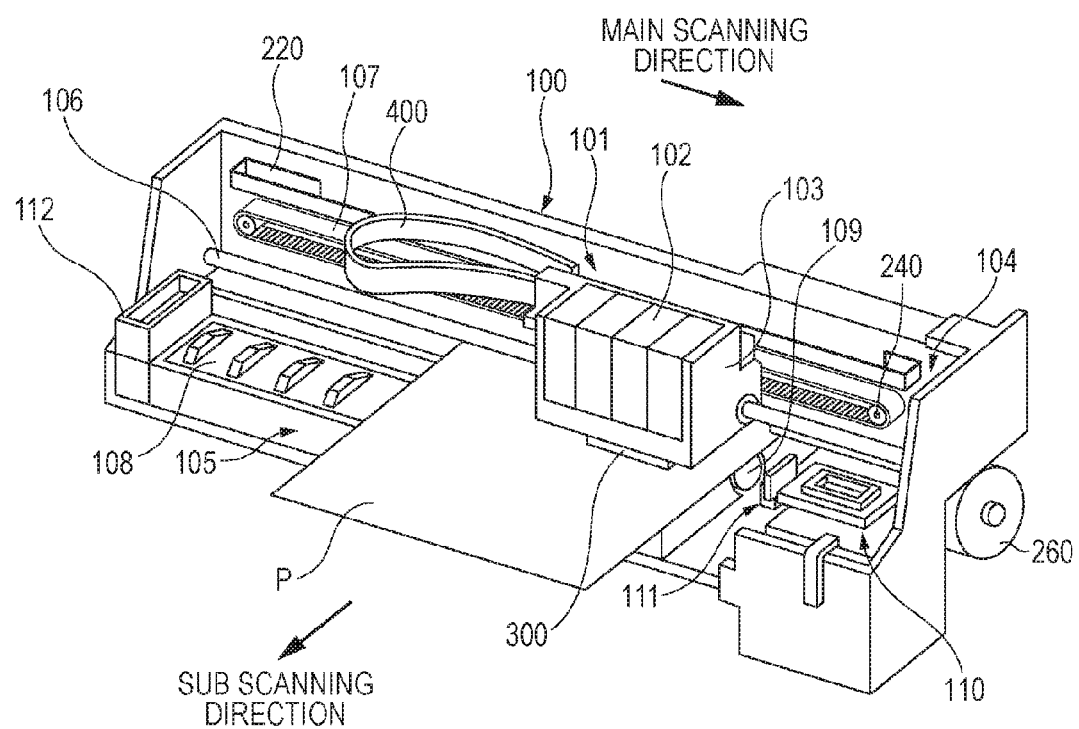
FIG. 9 is a view schematically illustrating a configuration of a printing apparatus.

FIG. 9 is a perspective view schematically illustrating an internal configuration of a printing apparatus 100 according to the embodiment. As illustrated in FIG. 9, the printing apparatus 100 includes a moving mechanism 104 that moves a moving object 101 (causes the moving object 101 to reciprocate) in a main scanning direction.

The moving mechanism 104 includes a carriage motor 240 which is a driving source of the moving object 101, a carriage guiding shaft 106 of which the both ends are fixed, and a timing belt 107 which extends substantially in parallel to the carriage guiding shaft 106 and is driven by the carriage motor 240.

a carriage 103 of the moving object 101 is configured such that a predetermined number of ink cartridges 102 can be mounted thereon. For example, four ink cartridges 102, which respectively correspond to four colors of yellow, cyan, magenta, and black, are built into the carriage 103 and each of the ink cartridges 102 is filled with ink of corresponding color.

The carriage 103 is reciprocatably supported by the carriage guiding shaft 106 and is fixed to a portion of the timing belt 107. Therefore, when the carriage motor 240 drives the timing belt 107 to travel forward and backward, the moving object 101 reciprocates being guided by the carriage guiding shaft 106.

In addition, the moving mechanism 104 includes a linear encoder 220 for detecting the position in the main scanning direction of the moving object 101. The position in the main scanning direction of the moving object 101 is detected by the linear encoder 220.

In addition, a head unit 300 is provided on a portion of the moving object 101 which faces a printing medium P. The head unit 300 is for ejecting ink droplets (liquid droplets) via a plurality of nozzles and is configured such that various control signals are input thereto through a flexible cable 400.

The printing apparatus 100 includes a transporting mechanism 105 that transports the printing medium P in a sub scanning direction above a platen 108. The transporting mechanism 105 includes a transporting motor 260 which is a driving source and a transporting roller 109 which rotates being driven by the transporting motor 260 and transports the printing medium P in the sub scanning direction.

At a time when the printing medium P is transported by the transporting mechanism 105, the head unit 300 ejects ink droplets on the printing medium P and thus an image is formed on the printing medium P.

In an end region of a movement range of the carriage 103, a home position which serves as a base point of scanning of the carriage 103 is set. On the home position, a capping member 110 which seals a nozzle forming surface of the head unit 300 and a wiping member 111 which wipes the nozzle surface are disposed. In addition, the printing apparatus 100 forms an image on the printing medium P through bidirectional operations of a forward moving operation in which the carriage 103 moves from the home position toward an end portion on the opposite side of the home position and a backward moving operation in which the carriage 103 returns to the home position from the end portion on the opposite side of the home position.

The head unit 300 attached to the carriage 103 moves above the printing medium P and moves above a flushing box 112 in accordance with movement of the carriage 103 and performs an operation of ejecting ink droplets to the printing medium P and a flushing operation of ejecting ink droplets to the flushing box 112.

2-2. Electrical Configuration of Printing Apparatus

Figure 10:
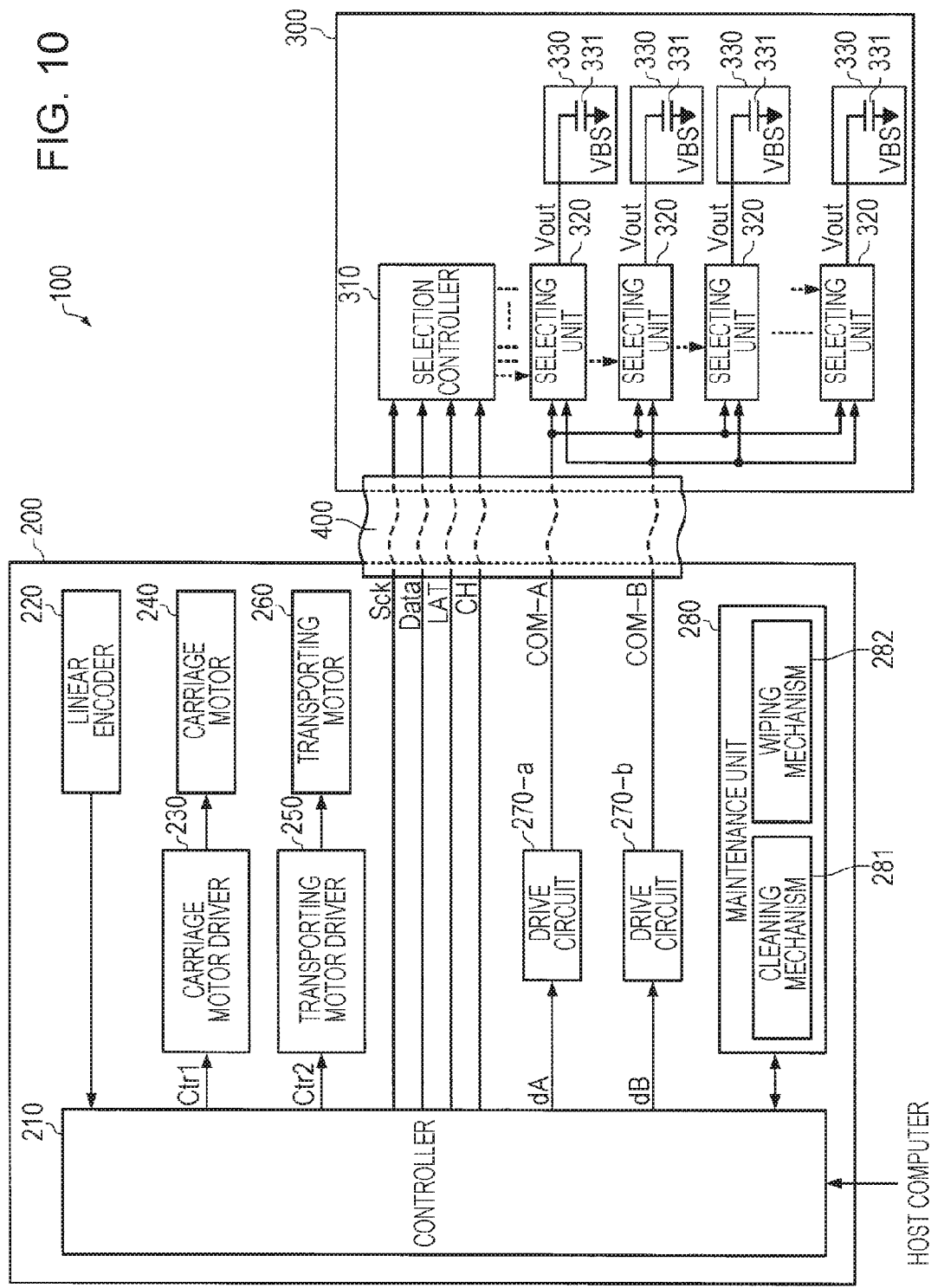
FIG. 10 is a block diagram illustrating an electrical configuration of the printing apparatus.

FIG. 10 is a block diagram illustrating an electrical configuration of the printing apparatus 100. As illustrated in FIG. 10, in the printing apparatus 100, a control unit 200 and the head unit 300 are connected to each other through the flexible cable 400.

The control unit 200 includes a controller 210, the linear encoder 220, a carriage motor driver 230, the carriage motor 240, a transporting motor driver 250, the transporting motor 260, a drive circuit 270-a, a drive circuit 270-b, and a maintenance unit 280. Among these components, the controller 210 outputs various control signals or the like to control each component when image data is supplied from the host computer.

Specifically, the controller 210 supplies a control signal Ctr1 to the carriage motor driver 230 and the carriage motor driver 230 drives the carriage motor 240 according to the control signal Ctr1. In this manner, movement of the carriage 103 in the main scanning direction is controlled.

The printing apparatus 100 includes the motor drive circuit 1 in the above-described embodiment as the carriage motor driver 230. In addition, the controller 210 grasps the position in the scanning direction (the current position) of the moving object 101 on the basis of a detection signal (encoder pulse) from the linear encoder 220 and supplies an enable signal included in the control signal Ctr1 to the carriage motor driver 230 on the basis of the position in the scanning direction of the moving object 101 so as to perform the enable PWM control.

Note that, the controller 210 corresponds to the control circuit 2 in the above-described embodiment, the carriage motor 240 corresponds to the motor 3 in the above-described embodiment, and the linear encoder 220 corresponds to the encoder 4 in the above-described embodiment.

In addition, the controller 210 supplies a control signal Ctr2 to the transporting motor driver 250 and the transporting motor driver 250 drives the transporting motor 260 according to the control signal Ctr2. In this manner, movement in the sub scanning direction due to the transporting mechanism 105 is controlled.

The printing apparatus 100 includes the motor drive circuit 1 in the above-described embodiment as the transporting motor driver 250. In addition, the controller 210 grasps the position in the transporting direction (the current position) of the printing medium P on the basis of a detection signal from an encoder (not shown) and supplies an enable signal included in the control signal Ctr2 to the transporting motor driver 250 on the basis of the position in the transporting direction of the printing medium P so as to perform the enable PWM control.

In addition, the controller 210 supplies digital data dA to one drive circuit 270-*a* of the two drive circuits 270-*a* and 270-*b* and supplies digital data dB to the other drive circuit 270-*b*. Here, the data dA defines the waveform of a driving signal COM-A among driving signals supplied to the head unit 300 and the data dB defines the waveform of a driving signal COM-B.

The drive circuit 270-*a* supplies the driving signal COM-A having been subjected to class D amplification to the head unit 300 after the data dA is subjected to analog conversion. Similarly, the drive circuit 270-*b* supplies the driving signal COM-B having been subjected to class D amplification to the head unit 300 after the data dB is subjected to analog conversion.

In addition, the controller 210 supplies a clock signal Sck, a data signal Data, and control signals LAT and CH to the head unit 300.

In addition, the controller 210 causes the maintenance unit 280 to execute maintenance processing for recovering a normal ink ejection state in an ejecting section 330. The maintenance unit 280 may include a cleaning mechanism 281, which is for executing cleaning processing (pumping processing) of suctioning thickened ink or bubbles in the ejecting section 330 using a tube pump (not shown) as the maintenance processing. In addition, the maintenance unit 280 may include a wiping mechanism 282, which is for executing wiping processing of wiping out foreign substances such as paper dust adhering to the vicinity of the nozzles in the ejecting section 330 using the wiping member 111 as the maintenance processing.

The head unit 300 is provided with a selection controller 310, and a plurality of sets of a selecting unit 320 and a piezoelectric element 331. Note that, the head unit 300 may include the drive circuits 270-*a* and 270-*b*.

The selection controller 310 instructs each of the selecting units 320 whether to select any of the driving signal COM-A and COM-B (or whether to select no driving signal) using the control signal or the like supplied from the controller 210, and the selecting unit 320 selects the driving signals COM-A and COM-B according to the instruction from the selection controller 310 and supplies the driving signals COM-A and COM-B to an end portion of each piezoelectric element 331 as the driving signal. Note that, in FIG. 10, the voltage of the driving signal is represented by Vout. A voltage VBS is applied to the other end of each piezoelectric element 331 in common.

The piezoelectric element 331 is deformed (displaced) when a driving signal is applied thereto. The piezoelectric element 331 is provided corresponding to each of the plurality of ejecting sections 330 in the head unit 300. In addition, the piezoelectric element 331 is displaced according to a difference between the voltage Vout of the driving signal selected by the selecting unit 320 and the voltage VBS so that ink is ejected.

2-3. Configuration of Ejecting Section

Figure 11:
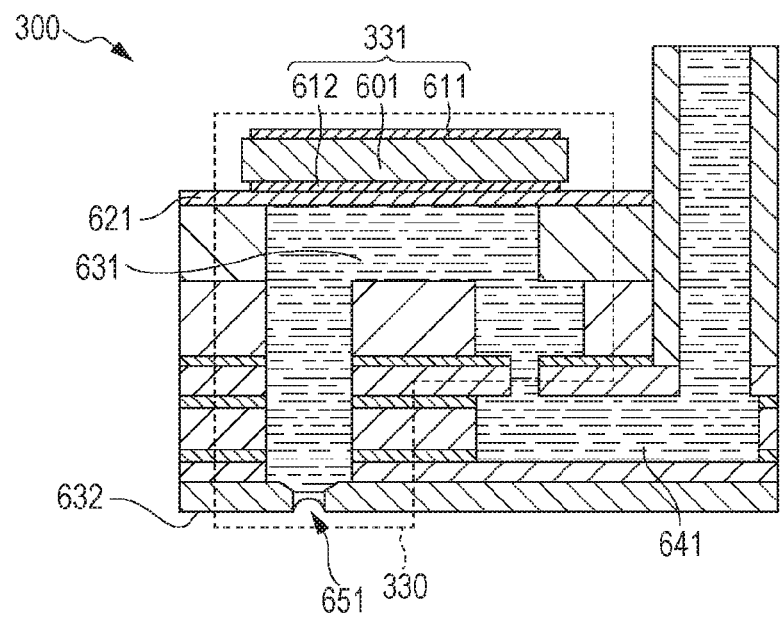
FIG. 11 is a diagram illustrating a configuration of an ejecting section of a head unit.

FIG. 11 is a diagram illustrating a schematic configuration in the head unit 300 corresponding to one ejecting section 330.

As illustrated in FIG. 11, in the head unit 300, the ejecting section 330 includes the piezoelectric element 331, a vibrating plate 621, a cavity (pressure chamber) 631, a reservoir 641 and a nozzle 651. Among these, the vibrating plate 621 is displaced (bending vibration) due to the piezoelectric element 331 provided on an upper surface of the vibrating plate 621 in FIG. 11 and functions as a diaphragm that increases or decreases the internal volume of the cavity 631 which is filled with ink. The nozzle 651 is an opening portion that is provided in a nozzle plate 632 and communicates with the cavity 631. The inside of the cavity 631 is filled with liquid (for example, ink) and the internal volume thereof is changed when the piezoelectric element 331 is displaced. The nozzle 651 communicates with the cavity 631 and ejects the liquid in the cavity 631 as liquid droplets in accordance with a change in internal volume of the cavity 631.

The piezoelectric element 331 illustrated in FIG. 11 has a configuration in which a piezoelectric body 601 is interposed by a pair of electrodes 611 and 612. The central portion in FIG. 11 of the piezoelectric body 601 in such a configuration is bent relative to the opposite end portions thereof in a vertical direction along with the electrodes 611 and 612 and the vibrating plate 621, according to the voltage applied by the electrodes 611 and 612. Specifically, the piezoelectric element 331 is configured to be bent upward when the voltage Vout of the driving signal increases and to be bent downward when the voltage Vout decreases. In this configuration, when the piezoelectric element 331 is bent upward, the internal volume of the cavity 631 is increased and thus ink from the reservoir 641 is drawn into the cavity 631 and when the piezoelectric element 331 is bent downward, the internal volume of the cavity 631 is decreased and the ink is ejected from the nozzle 651 or not depending on the degree of the decrease.

Note that, the configuration of the piezoelectric element 331 is not limited to that in the drawings as long as liquid such as ink can be ejected with the piezoelectric element 331 being deformed. In addition, the piezoelectric element 331 may be configured such that the longitudinal vibration is used instead of the bending vibration.

In addition, the piezoelectric element 331 is provided corresponding to the cavity 631 and the nozzle 651 in the head unit 300 and the piezoelectric element 331 is provided corresponding to the selecting unit 320 in FIG. 10. Therefore, a set of the piezoelectric element 331, the cavity 631, the nozzle 651 and the selecting unit 320 is provided for each of the nozzles 651.

2-4. Configuration of Driving Signal

Figure 12:
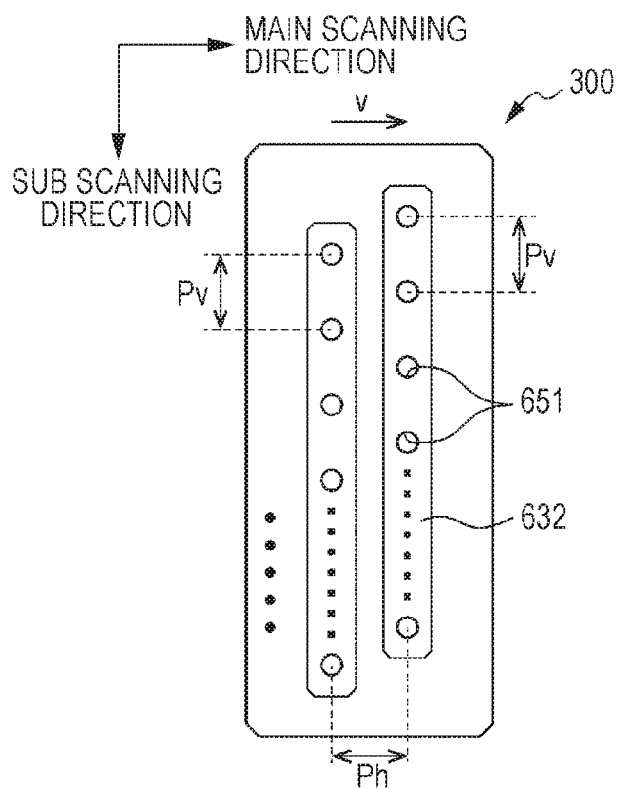
FIG. 12 is a diagram illustrating nozzle arrangement in the head unit.

FIG. 12 is a diagram illustrating an arrangement example of the nozzles 651. As illustrated in FIG. 12, the nozzles 651 are arranged in, for example, two rows as follows. Specifically, a plurality of nozzles 651 are arranged at a pitch Pv in the sub scanning direction in each row, and the two rows are separated from each other at a pitch Ph in the main scanning direction and are shifted with respect to each other at half the pitch Pv in the sub scanning direction.

Note that, regarding the nozzles 651, in a case of color printing, a pattern corresponding to respective colors of C (cyan), M (magenta), Y (yellow), and K (black) is provided in, for example, the main scanning direction. However, in the following description, a case where gradation is expressed using a single color will be described for simplification.

Figure 13:
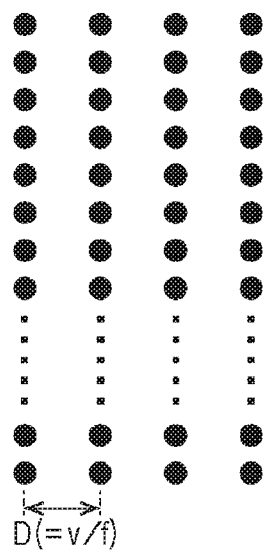
FIG. 13 is a diagram for explaining the basic resolution in image formation that is performed using the nozzle arrangement shown in FIG. 12.

FIG. 13 is a diagram for explaining the basic resolution in image formation that is performed using the nozzle arrangement shown in FIG. 12. Note that, FIG. 13 illustrates an example of a method (a first method) of forming one dot by ejecting ink droplets from the nozzle 651 one time for simplification of the description and a solid black circle indicates a dot that is formed by a landed ink droplet.

When the head unit 300 moves in the main scanning direction at a speed v, as illustrated in FIG. 13, a pitch D (in the main scanning direction) between dots which are formed by landed ink droplets and the speed v has a relationship as follows.

That is, in a case where one dot is formed by one time of ink droplet ejection, the dot pitch D is indicated by a value obtained by dividing the speed v by an ink ejecting frequency f (=v/f), in other words, a distance by which the head unit 300 moves within the period (1/f) of the repetitive ink droplet ejection.

In the example shown in FIGS. 12 and 13, the pitch Ph is proportional to the dot pitch D with a coefficient n and ink droplets ejected from the two rows of nozzles 651 are landed into the same row on the printing medium P. Therefore, as illustrated in FIG. 13, the dot pitch in the sub scanning direction is half of the dot pitch in the main scanning direction. It is needless to say that the dot arrangement is not limited to that in FIG. 13.

Meanwhile, in order to realize high-speed printing in a simple manner, it is sufficient to increase the speed v at which the head unit 300 moves in the main scanning direction. However, when only the speed v is increased, the dot pitch D is enlarged. Therefore, in order to realize the high-speed printing while securing a certain level of resolution, it is necessary to increase the ink ejecting frequency f and to increase the number of dots formed per unit time.

In addition, in order to increase the resolution without a change in printing speed, it is sufficient to increase the number of dots formed per unit time. However, in a case where the number of dots is increased, if the amount of ink is not small, adjacent dots are coupled to each other and if the ink ejecting frequency f is not increased, the printing speed becomes low.

As described above, in order to realize the high-speed printing and high-resolution printing, it is necessary to increase the ink ejecting frequency f.

Meanwhile, methods of forming dots on the printing medium P include a method (a second method) in which ink droplets can be ejected two or more times for each unit period, two or more ink droplets ejected in a unit period are landed, and the landed two or more ink droplets are coupled to each other to form one dot, and a method (a third method) in which the two or more ink droplets are not coupled to each other to form two or more dots in addition to the method in which one dot is formed with one time of ink ejection. In the following description, a case where dots are formed using the second method will be described.

In this embodiment, the second method will be described using the following exemplary case. That is, in the embodiment, ink is ejected at most two times for one dot to express four tones of a large dot, a medium dot, a small dot, and non-recording. In order to express the four tones, in the embodiment, the two kinds of driving signals COM-A and COM-B are prepared and each of the driving signals has a first half pattern and a second half pattern for one period. In the first half and the second half of one period, the driving signals COM-A and COM-B are supplied to the piezoelectric element 331 being selected according to the tone to be expressed (or not being selected).

Figure 14:
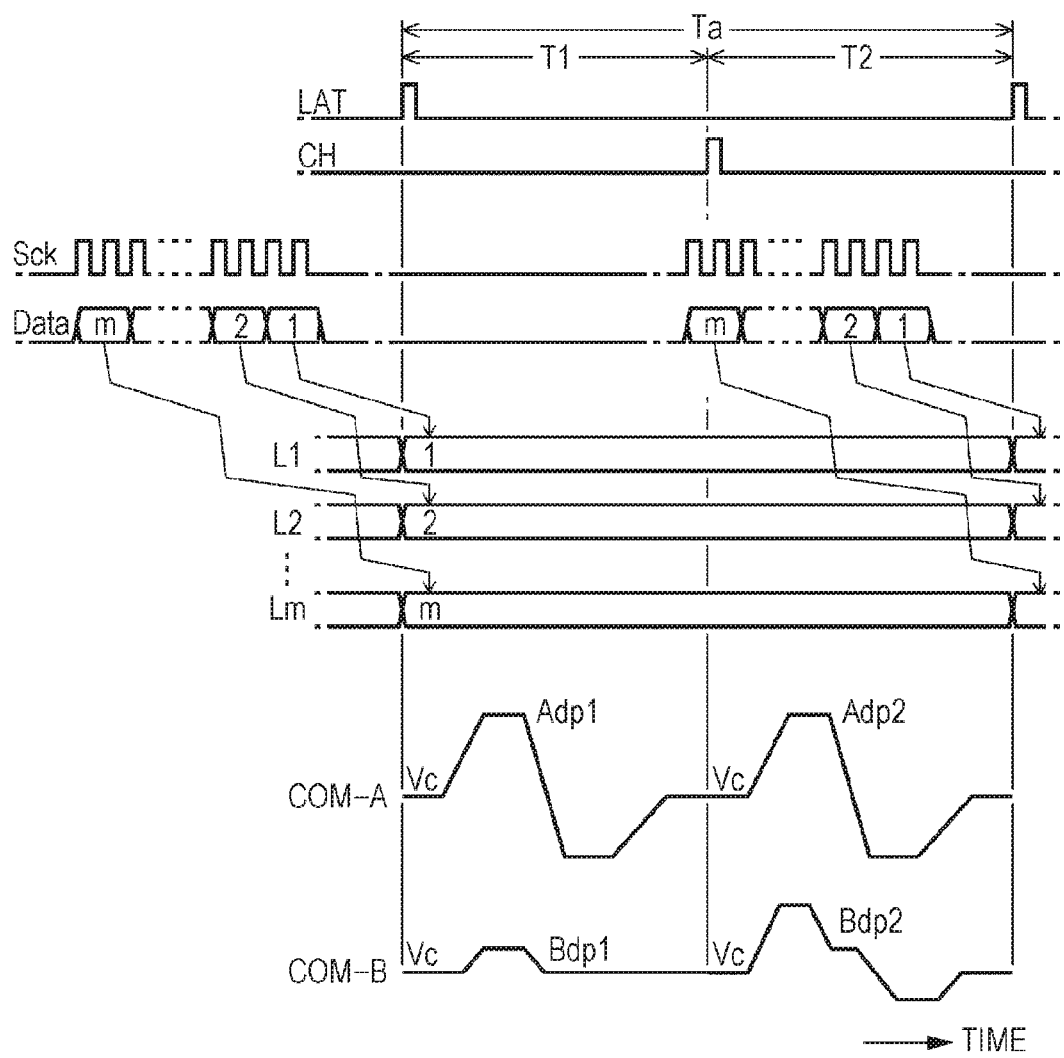
FIG. 14 is a diagram for explaining an operation of a selection controller in the head unit.

FIG. 14 is a diagram illustrating waveforms or the like of the driving signals COM-A and COM-B. As illustrated in FIG. 14, the driving signal COM-A has a waveform which is obtained by consecutively arranging a trapezoidal waveform Adp1 disposed for a period T1 between output (rise up) of the control signal LAT and output of the control signal CH which is a portion of a printing period Ta and a trapezoidal waveform Adp2 disposed for a period T2 between output of the control signal CH and output of the next control signal LAT which is a portion of the printing period Ta.

In the embodiment, the trapezoidal waveforms Adp1 and Adp2 are the substantially same waveform and if the trapezoidal waveforms Adp1 and Adp2 are supplied to one ends of the piezoelectric elements 331 respectively, a predetermined amount of ink, specifically, a medium amount of ink is ejected from each nozzle 651 corresponding to the piezoelectric elements 331.

The driving signal COM-B has a waveform which is obtained by consecutively arranging a trapezoidal waveform Bdp1 disposed for the period T1 and a trapezoidal waveform Bdp2 disposed for the period T2. In the embodiment, the trapezoidal waveform Bdp1 and Bdp2 are different waveforms. Among these, the trapezoidal waveform Bdp1 is a wave for causing minute vibration of ink in the vicinity of the opening portion of the nozzle 651 to prevent an increase in viscosity of the ink. Therefore, even if the trapezoidal waveform Bdp1 is supplied to one end of the piezoelectric element 331, no ink droplet is ejected from the nozzle 651 corresponding to the piezoelectric element 331. In addition, the trapezoidal waveform Bdp2 is a waveform different from the trapezoidal waveform Adp1 (Adp2). If the trapezoidal waveform Bdp2 is supplied to one end of the piezoelectric element 331, ink is ejected from the nozzle 651 corresponding to the piezoelectric element 331 by an amount smaller than the predetermined amount.

Note that, the voltage at the start timing of the trapezoidal waveforms Adp1, Adp2, Bdp1, and Bdp2 and the voltage at the end timing of the trapezoidal waveforms Adp1, Adp2, Bdp1, and Bdp2 are the same, which is a voltage Vc. That is, each of the trapezoidal waveforms Adp1, Adp2, Bdp1, and Bdp2 starts at the voltage Vc and ends at the voltage Vc.

As illustrated in FIG. 14, the clock signal Sck, the data signal Data, and the control signals LAT and CH are supplied to the selection controller 310 from the controller 210 in the control unit 200.

The data signal Data defines the size of one dot when forming the one dot in an image. In the embodiment, for expressing four tones of non-recording, a small dot, a medium dot, and a large dot, the data signal Data is constituted by 2 bits of a high-order bit (MSB) and a low-order bit (LSB).

The data signal Data is supplied in serial to each nozzle from the controller 210 in accordance with the main scanning operation of the head unit 300 being synchronized with the clock signal Sck. The selection controller 310 temporarily holds the data signal Data which is supplied in serial in a shift register (not shown) for two bits corresponding to a nozzle.

Specifically, shift registers of which the stage number corresponds to the piezoelectric element 331 (nozzle) are cascade-connected to each other, and the data signal Data which is supplied in serial is successively transferred to the subsequent stage in accordance with the clock signal Sck.

The selection controller 310 latches the data signal Data held by the shift register in a latch circuit (not shown) with rise up of the control signal LAT. Then, the selection controller 310 decodes the data signal Data of two bits which is latched by the latch circuit and outputs a selection signal for each of the periods T1 and T2 which are defined by the control signal LAT and the control signal CH so as to define selection in the selecting unit 320.

When the data signal Data of two bits is (1, 1), the selecting unit 320 selects the trapezoidal waveform Adp1 of the driving signal COM-A in the period T1 and selects the trapezoidal waveform Adp2 of the driving signal COM-A in the period T2.

When the trapezoidal waveform Adp1 is selected in the period T1, the trapezoidal waveform Adp2 is selected in the period T2 and the trapezoidal waveforms Adp1 and Adp2 are supplied to one end of the piezoelectric element 331 as the driving signal, a medium amount of ink ejected from the nozzle 651 corresponding to the piezoelectric element 331 through two times of ejection. Therefore, respective ink droplets are landed on the printing medium P and are combined to each other. As a result of this, a large dot as defined in the data signal Data is formed.

When the data signal Data of two bits is (0, 1), the selecting unit 320 selects the trapezoidal waveform Adp1 of the driving signal COM-A in the period T1 and selects the trapezoidal waveform Bdp2 of the driving signal COM-B in the period T2.

Accordingly, a medium amount of ink and a small amount of ink are ejected from the nozzle through two times of ejection. Therefore, respective ink droplets are landed on the printing medium P and are combined to each other. As a result of this, a medium dot as defined in the data signal Data is formed.

When The data signal Data of two bits is (1, 0), the selecting unit 320 selects none of the trapezoidal waveforms Adp1 and Bdp1 in the period T1 and selects the trapezoidal waveform Bdp2 of the driving signal COM-B in the period T2. In the period T1, a path to one end of the piezoelectric element 331 enters a high impedance state in which nothing is electrically connected to the path to one end of the piezoelectric element 331. However, the piezoelectric element 331 holds the immediately previous voltage (Vc-VBS) using its own capacitive property. In addition, a small amount of ink is ejected in the period T2 only, on the printing medium P, a small dot as defined in the data signal Data is formed.

When The data signal Data of two bits is (0, 0), the selecting unit 320 selects the trapezoidal waveform Bdp1 of the driving signal COM-B in the period T1 and selects none of the trapezoidal waveforms Adp2 and Bdp2 in the period T2.

Therefore, only the minute vibration of the ink in the vicinity of the opening portion of the nozzle 651 occurs in the period T1 and no ink is ejected. As a result of this, a not is not formed. That is, non-recording as defined in the data signal Data is achieved.

As described above, the selecting unit 320 selects (or not) the driving signals COM-A and COM-B according to an instruction from the selection controller 310 and supplies the driving signals to one end of the piezoelectric element 331. Therefore, each piezoelectric element 331 is driven according to the size of a dot defined in the data signal Data.

Note that, the driving signals COM-A and COM-B shown in FIG. 14 are merely an example. Actually, various combinations of waveforms prepared in advance are used according to the moving speed of the head unit 300, the properties of the printing medium P, and the like.

In addition, here, an example in which the piezoelectric element 331 is bent upward as the voltage rises is described. However, when the voltage supplied to the electrodes 611 and 612 is reversed, the piezoelectric element 331 is bent downward as the voltage rises. Therefore, in a configuration in which the piezoelectric element 331 is bent downward as the voltage rises, the waveform of the driving signals COM-A and COM-B in FIG. 14 is inverted with reference to the voltage Vc.

As described above, in the embodiment, one dot is formed on the printing medium P in units of periods Ta, the period Ta being the unit period. Therefore, in the embodiment in which one dot is formed with two times (at most) of ejection per period Ta, the ink ejecting frequency f is 2/Ta and the dot pitch D is obtained by dividing the speed v at which the head unit 300 moves by the ink ejecting frequency f (=2/Ta).

Generally, in a case where ink droplets can be ejected Q times (Q is an integer of 2 or more) within a unit period T0 and one dot is formed with the Q times of ink ejection, the ink ejecting frequency f can be represented by Q/T0.

As in the embodiment, in a case of forming dots with different sizes on the printing medium P, it is necessary to shorten the time taken to eject one ink droplet one time in comparison with a case of forming one dot with one time of ink droplet ejection even when the time (period) required to form one dot is the same for the both cases.

A particular explanation for the third method in which the two or more ink droplets are not coupled to each other to form two or more dots may not be needed.

2-5. Operation Effect

Since the printing apparatus 100 in the above-described embodiment includes the motor drive circuit 1 in the above-described embodiment as the carriage motor driver 230, according to the printing apparatus 100 in the embodiment, it is possible to reduce the power loss that is attributable to driving of the carriage motor 240. In addition, since the printing apparatus 100 in the above-described embodiment includes the motor drive circuit 1 in the above-described embodiment as the transporting motor driver 250, according to the printing apparatus 100 in the embodiment, it is possible to reduce the power loss that is attributable to driving of the transporting motor 260.

Although the embodiment has been described above, the present invention is not limited to the embodiment, and can be implemented in various modes without departing from the gist thereof.

For example, in the motor drive circuit 1 according to the above-described embodiment, an enable signal for enable PWM control of the drive current of the motor 3 is supplied from the control circuit 2. However, a control signal for constant current chopping control of the drive current of the motor 3 may be supplied from the control circuit 2.

in addition, for example, in the printing apparatus 100 according to the above-described embodiment, the motor drive circuit 1 drives the carriage motor 240 or the transporting motor. However, the motor drive circuit 1 may be used for driving a motor which drives a carriage on which an image sensor is mounted in a printing apparatus provided with an image reading unit (a scanning unit) or in an image reading apparatus (a scanning apparatus).

The present invention includes a configuration substantially the same as that described in the embodiment (for example, a configuration having the same function, a method, and a result, or a configuration having the same object and effect). Further, the present invention includes a configuration in which non-essential parts of the configuration described in the embodiment are replaced. Further, the present invention includes a configuration with which it is possible to achieve the same operation effect as the configuration described in the embodiment, or a configuration with which it is possible to achieve the same object as the configuration described in the embodiment. Further, the present invention includes a configuration in which a well-known technique is added to the configuration described in the embodiment.

What is claimed is:

1. A motor drive circuit which drives a motor, comprising:
   a driving unit that supplies a drive current to the motor based upon a control signal;
   an amplification unit that amplifies a potential difference between a first node of a wire, through which at least a portion of the drive current flows, and a second node of the wire; and
   a controller that generates the control signal based upon a comparison between the potential difference amplified by the amplification unit and a threshold voltage,
   wherein the driving unit is provided on a substrate in which a plurality of metallic layers are laminated via insulating layers,
   wherein the wire includes a first metal wire that is provided in a first metallic layer among the plurality of metallic layers and a second metal wire that is provided in a second metallic layer among the plurality of metallic layers,
   wherein the first node is provided in the second metal wire, and
   wherein the second node is provided in the first metal wire.

2. The motor drive circuit according to claim 1,
   wherein the wire is electrically connected to a terminal to which a reference potential is supplied.

3. The motor drive circuit according to claim 1,
   wherein the wire includes a third metal wire that is provided in a third metallic layer among the plurality of metallic layers, which is provided between the first metallic layer and the second metallic layer.

4. The motor drive circuit according to claim 1,
   wherein the first metallic layer is the metallic layer most distant from the substrate among the plurality of metallic layers, and
   wherein the second metallic layer is the metallic layer most close to the substrate among the plurality of metallic layers.

5. The motor drive circuit according to claim 1,
   wherein a resistance value between the first node and the second node of the wire is equal to or less than 0.1 Ω.

6. A printing apparatus comprising the motor drive circuit according to claim 1.

7. A semiconductor device which drives a motor, comprising:
   a driving unit that supplies a drive current to the motor based upon a control signal, the driving unit disposed within a semiconductor substrate;
   an amplification unit that amplifies a potential difference between a first node of a wire, through which at least a portion of the drive current flows, and a second node of the wire, the first node and the second node of the wire disposed within the semiconductor substrate; and
   a controller that generates the control signal based upon a comparison between the potential difference amplified by the amplification unit and a threshold voltage.

8. A motor drive circuit which drives a motor, comprising:
   a driving unit that supplies a drive current to the motor based upon a control signal;
   an amplification unit that amplifies a potential difference between a first node of a wire, through which at least a portion of the drive current flows, and a second node of the wire; and
   a controller that generates the control signal based upon a comparison between the potential difference amplified by the amplification unit and a threshold voltage,
   wherein the driving unit is provided on a substrate in which a plurality of metallic layers are laminated via insulating layers,
   wherein the wire includes a first metal wire that is provided in a first metallic layer among the plurality of metallic layers, and
   wherein the first node and the second node are provided in the first metal wire.

* * * * *